United States Patent Office 3,658,866
Patented Apr. 25, 1972

3,658,866
CATALYST FOR A HYDROSILATION REACTOR
Jiro Tsuji, Michio Hara, and Kiyotaka Ohno, Kanagawa-ken, Japan, assignors to Toray Industries, Inc., Tokyo, Japan
No Drawing. Filed Aug. 7, 1969, Ser. No. 848,333
Claims priority, application Japan, Aug. 26, 1968, 43/60,443; Sept. 21, 1968, 43/68,117; Sept. 26, 1968, 43/69,138
Int. Cl. C07f 7/08
U.S. Cl. 260—448.2 E    5 Claims

ABSTRACT OF THE DISCLOSURE

Catalysts are provided which are comprised of palladium and a trivalent phosphorus, arsenic or antimony ligand. The catalysts of this invention are highly effective as catalysts in hydrosilation reactions.

BACKGROUND OF THE INVENTION (1) Field of the invention

This invention relates to inexpensive, highly active, novel catalysts for a hydrosilation reaction. More particularly, this invention is concerned with novel catalysts having the same or higher activity than the platinum catalysts.

(2) Description of the prior art

The addition reactions of compounds having Si—H bonds (including polymers) to compounds having an olefinic double bond are broadly known as a hydrosilation reaction. (Pure and Applied Chemistry, 13, 141 (1966), and Journal of the American Chemical Society, 87, 16 [1965].) In hydrosilation reactions a catalyst is indispensable. In general hydrosilation reactions are carried out in the presence of a free radical initiator or a transition metal catalyst. Well known catalysts are, for example, nickel carbonyl, iron carbonyl, cobalt carbonyl, the platinum catalysts (metallic platinum or platinum compounds) and the rhodium catalysts. The carbonyl compounds are, however, so low in activities as to be impractical. Of the known catalysts, the platinum catalysts have the highest activity. However, platinum catalysts are very expensive.

It is accordingly an object of this invention to provide inexpensive, highly active catalysts for hydrosilation reactions and to provide a hydrosilation process using said catalyst.

SUMMARY OF THE INVENTION

The object of this invention has been achieved by providing catalysts comprised of palladium having trivalent phosphorus, arsenic or antimony as a ligand. The catalysts of this invention are highly effective in promoting hydrosilation reaction and are relatively inexpensive.

DESCRIPTION OF THE PREFERRED EMBODIMENTS

The catalyst of the present invention may be formed in situ by adding a phosphorus, arsenic or antimony compound and a palladium compound to the reaction system. It is also possible to make the catalyst in advance and add it to the hydrosilation reaction system.

In the hydrosilation reaction system due to the strong reducing effect of the Si—H groups, palladium becomes zerovalent regardless of the form in which it is added. It is believed that the catalyst of the present invention exhibits a catalytic activity because of the coordination of the phosphorus, arsenic or antimony acting as a ligand with the zerovalent palladium.

The phosphorus, arsenic and antimony compounds employed as the ligands must be able to form coordinate bonds. Trivalent phosphorus, arsenic or antimony compounds having a pair of unshared electrons in which the trivalent phosphorous, arsenic or antimony atom is bonded to a group such as an organic radical such as an aliphatic, an aromatic or an oxy group like an alkoxy or aryloxy, halogen or amino group are useful in the preparation of the catalyst of this invention. In general, because of their easy availability, the organic compounds are preferably employed. Especially preferable compounds are those which have at least one hydrocarbon type carbon or ether type oxygen bond such as the organic phosphines and phosphite. Especially preferable are compounds that contain at least one of alkyl, cycloalkyl, aryl, alkoxy, cycloalkoxy or aryloxy radicals having not more than 15 carbon atoms and which may also have halogen substituents.

Specific compounds are, for example, methylphosphine,
ethylphosphine,
propylphosphine,
dimethylphosphine,
diethylphosphine,
diisopropylphosphine,
trimethylphosphine,
triethylphosphine,
ethyldimethylphosphine,
triisopropylphosphine,
tributylphosphine,
tris(trifluoromethyl)phosphine,
tricyclohexylphosphine,
ethyldichlorophosphine,
propyldichlorophosphine,
isobutyldichlorophosphine,
chloromethyldichlorophosphine,
phenylphosphine,
diphenylphosphine,
triphenylphosphine,
tritolylphosphine,
tris(p-methoxyphenyl)phosphine,
tris(p-chlorophenyl)phosphine,
tris(m-chlorophenyl)phosphine,
tris(p-cyanophenyl)phosphine,
tris(p-carboethoxyphenyl)phosphine,
tetraphenyldiphosphine,
phosphorobenzene ($C_6H_5P{=}P{-}C_6H_5$),
phenyldichlorophosphine,
1-phosphabicyclo(2,2,2)octane,
diphenylchlorophosphine,
(phenyl)cyclopentamethylene phosphine,
diethyl-3-(9-ethylcarbazoyl)phosphonite,
2-thienyl dichlorophosphine,
phenyl phosphonous acid,
diethyl phenylphosphonite,
diethylethylphosphonite,
trimethyl phosphite, tributyl phosphite,
triphenyl phosphite,
tricyanophosphine,
phosphorus trichloride,
phosphorus trifluoride,
tris(dimethylamino)-phosphine,
trimorpholinophosphine,
tri(β-cyanoethyl)phosphine,
diphenyl (β-carbomethoxyethyl)phosphine,
p,p'-ethylenebis(diphenylphosphine),
p,p'-trimethylenebis(diphenylphosphine),
p,p'-tetramethylenebis (diphenylphosphine),
2,4-dichloro-1,3-diphenyl-1,3,2,4-diazadiphosphetidine

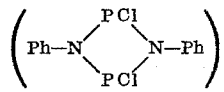

1,4-diphosphabicyclo(2,2,2)octane,
tetrakis(trifluoromethyl)cyclotetraphosphine,
hexakis(trifluoromethyl)-1,
4-diphosphabicyclo-(2,2,2)octatriene-(2,5,7)1,
4-diphenyl-1,
4-diphosphacyclohexane,
2-methoxy-1,
3-dioxaphosphorane

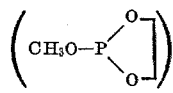

1-ethyl phosphorane,
tris(3-indolyl)phosphine,
diethyl[2-(diethylarsino)phenyl]phosphine,
3-methyl-1-phenylphospholine-(3)

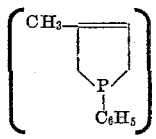

methylarsine,
ethylarsine,
dimethylarsine,
diethylarsine,
trimethylarsine,
tris(trifluoromethyl)arsine,
tris(β-chlorovinyl)arsine,
triarylarsine,
tetramethyldiarsine,
tetraethyldiarsine,
tetrakis(trifluoromethyl)diarsine,
diethylchloroarsine,
dichlorohexylarsine,
phenylarsine,
p-tolylarsine,
p-aminophenylarsine,
diphenylarsine,
triphenylarsine,
ethylphenylarsine,
tri-p-tolylarsine,
tri-p-nitrophenylarsine,
tetraphenyldiarsine,
arsenobenzene,
ethanearsenobenzene,
diphenylchloroarsine,
diphenylbromoarsine,
diethyl phenylarsonite,
diphenyl arsonius acid,
ethyl phenylmethylarsonite,
tri-2-thienylarsine,
tri-2-furylarsine,
(cyclopentamethylene)phenylarsine,
phenylthiarsane,
teryamethyl distibine,
tetraphenyldistibine,
triphenylstibine,
tripropylstibine,
phenyldichlorostibine,
tritolylstibine,
tri-2-thienylstibine,
(cyclopentamethylene)phenylstibine, etc.

The above are typical organic compounds. It should be noted, however, that this invention is not limited to the specifically named organic compounds.

The preferred palladium source is metallic palladium. When metallic palladium is employed not only metallic palladium per se such as palladium black, but also metallic palladium which is supported by carriers such as asbestos, activated carbon, alumina or silica may be used. It is also possible to use compounds having palladium as a central metal as the starting material. Even though the catalysts of this invention are based on the actions of the ligand and elemental palladium, palladium compounds can be employed since the palladium present as central metal in the compounds is reduced to metallic palladium by the hydrosilane compounds.

As specific examples of palladium sources, metallic palladium and the following palladium compounds may be cited. The halides such as palladium chloride, palladium bromide and palladium iodide, the inorganic acid salt and organic acid salt such as palladium cyanide, palladium nitrate, palladium sulfate, palladium formate, palladium acetate, palladium propionate and palladium benzoate, palladium oxide and the palladium complexes, for example, palladium acetylacetonate, palladium olefin complexes, palladium chloride benzonitrile complex, π-allyl palladium complex, palladium chloride cyclohexanoneoxime complex, dimethylglyoxime complex, palladium bromide dimethyl sulfoxide complex, cyclooctadiene palladium chloride, sodium chloropalladate, π-allyl (acetylacetonate)palladium, palladium chloride butadiene complex, bis(π-allyl)palladium, palladium chloride aniline complex, dipyridyl complex, phenanthroline complex, dimethylbenzylamine complex, cyclopentadienyl chloropalladium, complexes of an α-amino acid such as palladium chloride glycine complex, K₂[Pd(C≡CH)₂], K₂[Pd(C≡C—CH₃)₂],

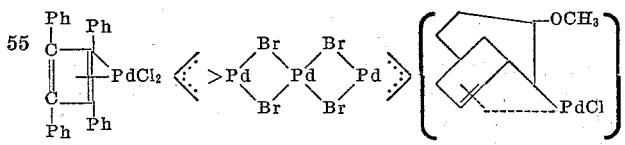

trans-Pd(NH₃)₂(NO₂)₂ and

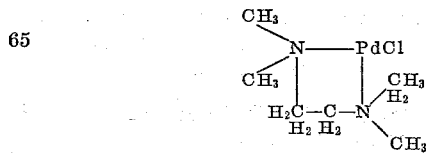

As to the ratio between the palladium source and the ligand, it is preferable to use 0.5–20 equivalents, especially 1–10 equivalents, of phosphorous, arsenic or antimony per equivalent of palladium. The complex of the ligand and palladium can be formed in advance and added in complex form to the hydrosilation reaction system. Specific examples of such complexes are as follows:

tetrakis(triphenylphosphine)palladium,
tetrakis(tributylphosphine)palladium,
tetrabis(tritolyphosphine)palladium,
tetrakis(tricyclohexylphosphine)palladium,
bis(triphenylphosphine)dichloropalladium
   [PdCl$_2$(PPh$_3$)$_2$],
bis(triethylphosphine)dichloropalladium,
bis(triphenylphosphine)dibromopalladium,
bis(tricyclohexylphosphine)dichloropalladium,
π-allyl(triphenylphosphine)palladium chloride,
tris(triphenylphosphine)cyclohexylisonitrile palladium,
bis(triphenylphosphine)palladium oxygen complex,
bis(tributylphosphine)chloromethyl palladium, various olefin complexes of bis(triphenylphosphine)palladium (as olefinic compounds, maleic anhydride, maleic acid ester, tetracyanoethylene, tetrachloroethylene, fumaric acid, benzoquinone, naphthoquinone, cyclohexene and cyclooctene may be cited), a bidentate ligand phosphine complex, for example, [ethylenebis(diphenylphosphine)]dichloropalladium, bis(triphenylarsine)dichloropalladium, tetrakis(triphenylarsine)palladium and bis(triphenylstibine)dichloropalladium.

Hydrosilation reactions using the catalyst of the present invention are conducted under the same conditions as are employed using the prior art catalysts. The same classes of starting materials are used. Silicone compounds (including polymers) having at least one Si—H bond are reacted with compounds (including polymers) having at least one olefinic double bond. As representative reactions, there is for example the reaction of olefins with silane compounds, the reaction of conjugated olefins with hydrosilane compounds and the reaction for preparing polymers.

The catalyst of the present invention can be recovered from the reaction system after the reaction is completed and regenerated by reacting an additional amount of the ligand with the recovered palladium catalyst.

The hydrosilane compounds employed in the present process are the same as those employed in the prior art. The silicone atoms of the hydrosilane compounds are substituted with 1–3 hydrogen groups with the remaining silicone valences being satisfied by groups which do not adversely affect the hydrosilation reaction. For example, a halogen group such as fluorine, chlorine, bromine and iodine, an alkyl group such as methyl, ethyl, propyl, butyl, isobutyl and cyclohexyl, an aryl group such as phenyl, tolyl and naphthyl, an arylalkyl group such as benzyl, an alkoxy group such as methoxy, ethoxy and phenoxy, or an inert substituent which is substituted for one of the above groups and a siloxane group (the number of carbon atoms of these groups is preferably not more than 15, and preferably, not more than 10).

Specific compounds which are useful in the present invention are trichlorosilane, tributylsilane, trimethylsilane, triethylsilane, triphenylsilane, tritolylsilane, trimethoxysilane, triethoxysilane, methyldichlorosilane, dimethylchlorosilane, methyldiethylsilane, ethyldichlorosilane, phenyldichlorosilane, dimethylmethoxysilane, tricyclohexylsilane, tetramethyldisiloxane, tetraethyldisiloxane, dichlorosilane, chlorosilane, chloromethylsilane, diethylsilane and dimethylsilane. However it goes without saying that said silane compounds which may be employed are not limited to the compounds listed above.

The lower olefin compound can be used in this invention with the 1-olefin being most preferable. Alicyclic olefins can also be used and also olefin compounds having a double bond connected to a functional group can be used.

The following named olefin compounds may be employed. However, it goes without saying that other olefin compounds of the described class can also be used. Ethylene, propylene, 1-butene, isobutene, 1-pentene, 2-methyl-1-pentene, 1-hexene, 1-octene, 1-decene, cyclohexene, cyclooctene, vinylcyclohexene, 1,4-pentadiene, 1,4-hexadiene, styrene, acrylic acid, acrylonitrile, methacrylic acid, methyl methacrylate, vinyl chloride, vinyl acetate, 1-hexenoic acid, 1-octenoic acid, 1-undecenoic acid, vinyl ethyl ether, aryl ethyl ether and a high molecular weight ethylenically unsaturated compound such as 1,2 - polybutadiene can be used. As conjugated olefins, specific attention is directed to 1,3-butadiene, 1,3-pentadiene, 1,3-heptadiene, isoprene, 2,3- dimethyl-1, 3-butadiene, 2-methyl-1, 3-pentadiene, chloroprene, 2-methoxyl-1, 3-butadiene, 1, 3,7-octatriene, 1,3,6-octatriene, 3-methyl-1, 4,6-heptatriene, 1,3,6,10-dodecatetraene, 1,3-cyclooctadiene and 2,4-pentadienoic acid ester.

The hydrosilation reaction using the catalyst of this invention is conducted in the following manner. The hydrosilane compound is blended with the olefin compound, to which mixture the palladium catalyst is added. A catalytically effective amount of the palladium catalyst is added which is normally an amount of about 0.00001–1 mol percent based on the hydrosilane reactant.

The reaction does not have to be conducted in solvent, however, from the operational viewpoint of the reaction it is convenient to use a reaction solvent such as benzene, toluene, hexane, ether, dimethoxyethane and tetrahydrofuran. The hydrosilation reaction will take place at room temperature. However, it is preferable to heat the reactants so as to increase the reaction rate, with a temperature of 50–200° C. being in the preferred range.

After the reaction is completed, the products may be separated by simple procedures such as distillation or recrystallization. The palladium catalyst recovered after the separation may be used again. As the occasion demands, a ligand of the above described type is added to the recovered palladium catalyst which causes a regeneration of the catalytic activity with corresponding increase in the yield of the product.

Typical methods of employing the hydrosilation reaction for the preparation of organosilicone polymer are as follows:

A hydrosilane compound having at least two Si—H bonds which includes those compounds having a single silicone atom bonded with at least two H atoms are polymerized with an unsaturated compound (including compounds which may contain a silicone atom) having at least two olefinic double bonds.

Organosilicone polymers having a Si—H bond (polyhydrosiloxane, etc.) are polymerized with monomers or polymers having an olefinic double bond (unsaturated polysiloxane, etc.).

Organosilicone polymers having an olefinic double bond are polymerized with hydrosilanes. The polymerization reaction using monomers proceeds as follows:

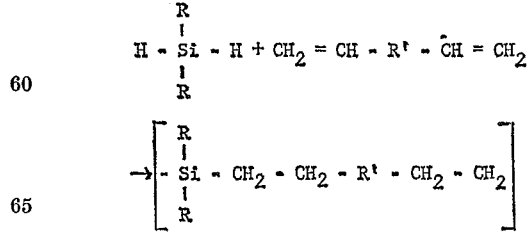

wherein R is a hydrocarbon group such as an alkyl or aryl group and R' is a divalent organic residual group. In this case as a compound having an olefinic double bond there can be mentioned for example, difunctional unsaturated esters such as divinyl carboxylate, diallyl carboxylate and alkylene dimethacrylate, and divinyl benzene, 1,4-hexadiene and 1,7-octadiene.

As monomers or polymers having a Si—H bond, both open chain and cyclic compound may be used. The siloxane compound which are preferably employed have at least one Si atom bond to an H atom, and contain at least one unit of the formula

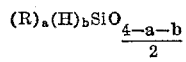

wherein $a$ is 0–1, $b$ is 1–2 and the sum of $a+b$ is 1–3.

As a cyclic siloxane, for example, known compounds of the formula may be employed

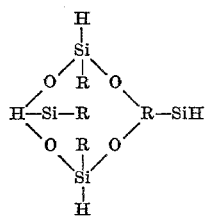

wherein R, an alkyl group such as methyl, ethyl, propyl, butyl, and octyl, an aryl group such as phenyl, naphthyl, tolyl and xylyl, an aralkyl group such as benzyl and phenylethyl or a cycloalkyl group such as cyclohexyl and cyclooctyl. As specific examples of such compound, there are compounds of the formula

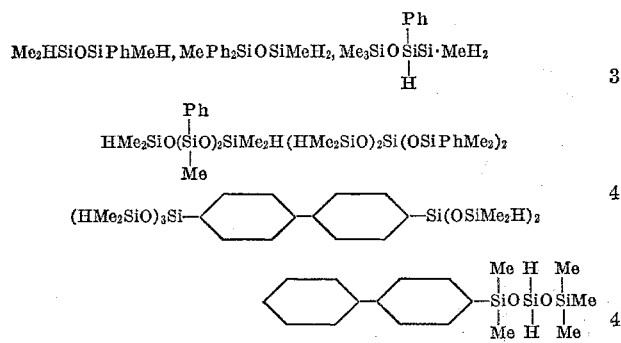

dimethyldiphenylcyclotetrasiloxane, tetramethyl diphenylcyclotetrasiloxane

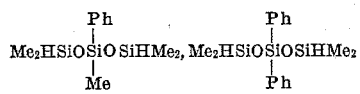

PhSi(OSiHMe$_2$)$_3$, Si(OSiHMe$_2$)$_4$, O(SiMe$_2$H)$_2$, 1,3-dimethyldisiloxane, 1,1,3-trimethyldisiloxane, 1,1,3,3-tetramethyl disiloxane where Me stands for the methyl group and Ph stands for the phenyl group and a high molecular weight polymer having about 100,000 silicone atoms per molecule. As the olefinic double bond in one of the reactants, a terminal double bond such as in the vinyl group or the allyl group is preferably used.

Non-silane type polymers having an acrylic acid group or a methacrylic acid group as side chain or terminal group or non-silicone type polymer having an olefinic double bond at a terminal or side chain such as 1,2-polybutadiene are advantageously used. Organosilicone compounds having an olefinic double bond are also preferred reactants. As such compound, there are, for example, 1,5-divinyl-1,3,3,5,7,7-hexamethylcyclotetrasiloxane,
1,5-diallyl-1,3,3,5,7,7-hexamethylcyclotetrasiloxane,
1,5-diallyl-1,3,3,5,7,7-hexaphenylcyclotetrasiloxane,
1,5-divinyl-1,5-diphenyl-3,3,7,7-tetramethylcyclotetrasiloxane and polymers containing siloxane radicals such as monovinyl siloxane, divinyl siloxane, phenylvinyl siloxane, methylvinyl siloxane, trivinyl siloxane, divinylmethyl siloxane, divinylphenyl siloxane, monovinyldimethylsiloxane, monovinyldiphenyl siloxane and monovinylphenylmethyl siloxane.

The hydrosilation reaction when employing polymerizable reactants is conducted by merely mixing, preferably mixing with heating at 30–200° C., the reactants in the presence of the catalyst. Reaction solvent, etc. may be added. By hydrosilation of the above bifunctional or polyfunctional monomers, organosilicone polymers are obtained. By using a polymer as at least of the reactants, the hydrosilation reaction depending on the kind and combination of the reactants will raise the degree of polymerization and/or the cross-linking and graft polymers may be obtained.

In the hydrosilation reaction, the ratio of the starting materials should preferably be such that a Si—H bonds and the olefinic double bonds are approximately equivalent.

EXAMPLE 1

Trichlorosilane (0.05 mol, 6.77 g.) and 1-hexene (0.05 mol, 4.2 g.) were charged in a sealed glass tube, to which 0.2 g. of tetrakis(triphenylphosphine)palladium was added as a catalyst, and the glass tube was heated at 120° C. for 5 hours. The tube was cooled and by distillation at a boiling point of 87–89° C. (30 mm.), 9.9 g. (yield: 90%) of 1-(trichlorosilyl)hexane was obtained.

When 100 mg. of triphenylphosphine was added to the recovered catalyst, it showed the same catalytic activity as the virgin catalyst.

EXAMPLE 2

Trimethoxysilane (6.1 g.) was reacted with 1-hexene (4.2 g.) in the presence of 0.2 g. of bis(tricyclohexylphosphine) dichloropalladium at 130° C. for 5 hours. By distillation, 3.1 g. (30%) of 1-(trimethoxysilyl)hexane was obtained. The infrared spectrum of this product was in accord with that of a standard product synthesized by the process of the prior art.

EXAMPLE 3

1-octene (5.6 g.) was reacted with triethylsilane (5.8 g.) in the presence of tetrakis(triphenylphosphine)palladium (0.2 g.) at 120° C. for 5 hours, the reaction liquid was distilled to obtain 1-(triethylsilyl)otane (3.4 g.) (30%) at 129–130° C./20 mm.

EXAMPLE 4

Acrylonitrile (2.65 g.) and trichlorosilane (6.77 g.) were charged into a sealed glass tube, to which 0.2 g. of tetrakis(tributylphosphine)palladium was added as a catalyst, and the mixture was reacted at 120° C. for 8 hours. By distillation, 3.77 g. (40%) of α(trichlorosilyl)-propionitrile was obtained. The infrared spectrum of the product was in accord with that of a standard product synthesized by the process of the prior art.

EXAMPLE 5

Example 1 was repeated except using as a catalyst 0.2 g. of bis(triphenylphosphine)palladium maleic anhydride complex to obtain 10.4 g. (95%) of 1-(trichlorosilyl)-hexane.

EXAMPLE 6

Styrene (5.2 g.) was reacted with trichlorosilane (6.77 g.) in the presence of bis(triphenylphosphine)dibromopalladium (0.2 g.) as a catalyst at 110° C. for 5 hours. By distillation (130–131° C./32 mm.), 10.8 g. (90%)

of α-(trichlorosilyl)ethylbenzene was obtained. The NMR spectrum of this compound showed the following peaks. 8.36 τ (doublet 3H), 7.14 τ (quintet, 1 H) and 2.70 τ (singlet, 5 H).

EXAMPLE 7

Example 6 was repeated except using as a catalyst palladium bromide (0.1 g.) added with triphenylphosphine (1.1 g.) to obtain 11.5 g. (96%) of α-(trichlorosilyl)-ethylbenzene.

EXAMPLE 8

Palladium chloride benzonitrile complex had hardly any catalytic activity. However, when 0.1 g. of this complex was dissolved in 5 cc. of benzene, to which 1.1 g. of triphenylphosphine was added and the resulting product used as a catalyst for reacting trichlorosilane (6.77 g.) with styrene (5.2 g.) at 110° C. for 5 hours, by distillation (130–131° C./32 mm.), 10.8 g. (90%) of α-(trichlorosilyl)ethylbenzene was obtained.

EXAMPLE 9

Palladium chloride cyclohexene complex also had no catalytic activity per se, however, the product obtained by adding to 0.1 g. of this complex 1.1 g. of triphenylphosphine was used as a catalyst in reacting 1-hexene (4.2 g.) with trichlorosilane (6.77 g.) at 120° C. for 5 hours, and by distillation at a boiling point of 87–89° C. (30 mm.), 9.3 g. (yield 85%) of 1-(trichlorosilyl)hexane was obtained. When triphenylphosphine (0.5 g.) was added to the recovered catalyst and the same reaction was carried out, 9.1 g. of 1-(trichlorosilyl)hexane was obtained.

EXAMPLE 10

Triethoxysilane (8.2 g.) was reacted with 1-hexene (4.2 g.) in the presence of palladium chloride (0.1 g.) and tricyclohexyl phosphine (1.1 g.) at 130° C. for 5 hours. By distillation, 3.5 g. (28.2% of 1-(triethoxysilyl)-hexane was obtained.

EXAMPLE 11

Trimethylsilane (3.7 g.) was reacted with acrylonitrile (2.65 g.) in the presence of the catalyst consisting of palladium acetylacetonate (0.2 g.) and triphenylphosphine (1.1 g.) at 120° C. for 6 hours to obtain 2.9 g. (45.6%) of α(trimethylsilyl)propionitrile.

EXAMPLE 12

Metallic palladium prepared by reducing 0.1 g. of palladium chloride with a small amount of trichlorosilane, triphenylphosphine (1.0 g.) trichlorosilane (0.1 mol, 13.55 g.) and 1 mol of ethylene were charged in an autoclave, and placed under a pressure of 50 kg./cm.$^2$, and the content was reacted at 120° C. for 5 hours. After the reaction was completed 15.2 g. (93%) of (trichlorosilyl)ethane was obtained by distillation. The confirmation of the product was confirmed by comparing the infrared spectrum thereof with the infrared spectrum of a product obtained by the prior art method.

EXAMPLE 13

1-octene (5.6 g.) was reacted with triethylsilane (5.8 g.) in the presence of a catalyst consisting of commercially available palladium black (0.1 g.) and triphenylphosphine (1.0 g.) at 120° C. for 5 hours. The reaction product was distilled to obtain at 129–130° C./20 mm., 3.1 g. (27%) of 1-(triethylsilyl) octane.

EXAMPLE 14

Acrylonitrile (2.65 g.) and trichlorosilane (6.77 g.) were charged in a sealed glass tube, to which palladium black (0.1 g.) and tributylphosphine (0.8 g.) were added as the catalyst, and the content was reacted at 100° C. for 5 hours. By distillation at 82–83° C./40 mm., 3.8 g. (40%) of α-(trichlorosilyl) propionitrile was obtained. The infrared spectrum of this product was in accord with that of a standard product synthesized by the process of the prior art.

EXAMPLE 15

Trichlorosilane (6.77 g.) and butadiene (5 cc.) were charged in an autoclave, to which metallic palladium prepared from 0.1 g. of palladium chloride and 0.5 g. of triphenylphosphine were added as the catalyst, and the content was reacted at 80° C. for 5 hours. After the reaction by distillation at 140–142° C., 9.3 g. of 1-(trichlorosilyl)-2-butene was obtained. The confirmation of this product was carried out by the following peaks of NMR spectrum. 8.92τ (doublet 3 H), 8.03τ (doublet, 2 H) and 3.2–4.2τ (multiplet, 2 H). After the reaction when 1.0 g. of triphenylphosphine was added to the recovered metallic palladium and the same reaction was carried out, 9.1 g. of 1-(trichlorosilyl)-2-butene was obtained. This operation was repeated for three times, with the same results being obtained.

EXAMPLE 16

Using 1 g. of 10% palladium on activated carbon and 0.8 g. of triphenylphosphite as the catalyst, isoprene (3.4 g.) was reacted with trichlorosilane (6.77 g.) at 100° C. for 5 hours. By distilling the reaction product, 9.3 g. of 1-(trichlorosilyl)-2-methyl-2-butene having a boiling point of 60–65° C. (20 mm. Hg) was obtained. The confirmation of the structure of the product was confirmed by the following NMR spectrum. 8.36τ (doublet, 3 H), 8.15τ (singlet, 3 H), 7.62τ (singlet, 2 H) and 4.54τ (quintet, 1 H).

EXAMPLE 17

1,3,5,7 - tetramethyl-1,3,5,7-tetravinylcyclotetrasiloxane (8.6 g., 0.025 mol) was mixed with 1,3,5,7-tetramethyl-1,3,5,7-tetrahydrocyclotetrasiloxane (6.0 g., 0.025 mol), to which mixture 0.1 g. of tetrakis(triphenylphosphine) palladium was added as a catalyst, and when the entirety was heated at 120° C. for 20 hours, the solution became an optically transparent, hard, glassy polymer. This polymer was an organopolysiloxane wherein each silicone atom was a member of mutually connected 8-member ring of silicone atoms, substantially all the silicone atoms in the polymer bonded to one methyl group and substantially all the silicone atoms in the polymer bonded to other silicone atoms via ethylene groups.

EXAMPLE 18

When the procedure in Example 17 was repeated using as a catalyst bis(triphenylphosphine)dichloropalladium (0.2 g.), a similar polysiloxane was obtained.

EXAMPLE 19

1,3,5,7 - tetramethyl-1,3,5,7-tetraallylcyclotetrasiloxane (10 g., 0.025 mol) was mixed with 1,5-diphenyl-3,7-dimethyl-1,3,5,7-tetrahydrocyclotetrasiloxane (9.1 g., 0.025 mol) and tetrakis(triphenylphosphine)palladium (0.2 g.) was added as the catalyst. When the mixture was heated at 120° C. for 24 hours, a resinous material was obtained. This polymer was an organopolysiloxane in which each of the silicone atoms was a member of an 8-member ring consisting alternately of silicone atoms and oxygen atoms. Substantially all the silicone atoms were bonded to either methyl groups or phenyl groups and substantially all the silicone atoms were also bonded to other silicone atoms via trimethylene groups.

EXAMPLE 20

1,3,5,7 - tetravinyl-1,3,5,7-tetramethylcyclotetrasiloxane (8.6 g., 0.025 mol) and 1,5-dihydro-1,3,5,7,7-hexamethylcyclotetrasiloxane (13.4 g., 0.05 mol) were heated at 120° C. for 20 hours in the presence of 0.2 g. of tetrakis(tritolylphosphine)palladium to give a glassy polymer. This polymer contained a first group of organocyclotetrasiloxane units and a second group of organocyclotetrasiloxane units, the number of the second group of organocyclotetrasiloxane units was substantially two times the number of the first group of organocyclotetrasiloxane units. Each unit of said first group was bonded to 4 units of said second group via a silicone-bonding ethylene group. Each unit of said second group was bonded to 2 units of said first group via silicone-bonding alkylene groups at 1- and 5-positions and the valence of silicone other than the valence filled by oxygen in the cyclotetrasiloxane ring was filled by a methyl group. Even when this polymer was boiled in organic solvents such as acetone and toluene, the polymer showed no change in weight.

EXAMPLE 21

Example 20 was repeated except using instead of the hydrogen-containing siloxane of Example 20, 1,5-dimethyl 1,5-dihydro-3,3,7,7-tetraphenyl cyclotetrasiloxane and a similar polymer was obtained.

EXAMPLE 22

When 1,5-diallyl-1,3,3,5,7,7-hexamethylcyclotetrasiloxane (17.4 g., 0.05 mol) and 1,3,5,7-tetramethyl-1,3,5,7-tetrahydrocyclotetrasiloxane (6.0 g., 0.025 mol) were heated at 120° C. for 25 hours in the presence of 0.2 g. of π allyl(triphenylphosphine)palladium chloride, a glassy polymer similar to that in Example 17 was obtained.

EXAMPLE 23

Methylvinylpolysiloxane containing 1.0 mol percent of a methylvinylsiloxane, 1.0 mol percent of a dimethylvinylsiloxane and 98 mol percent of a dimethylsiloxane was prepared. To the liquid methylvinylpolysiloxane, 1,1,3,3-tetramethyldisiloxane was added an amount sufficient to make the ratio of silicone-hydrogen group to silicone-bonding vinyl group 1.6:1. Tetrakis(tributylphosphine) palladium was added as a catalyst in an amount sufficient that the ratio of palladium catalyst to the silicone-bonding vinyl groups was 1:2,000. When the reaction mixture was heated at 120° C. for 10 hours, a rubbery material was obtained.

EXAMPLE 24

Diphenylsilane (7.4 g., 0.04 mol) was mixed with diallylmalonate (7.4 g., 0.04 mol), to which a mixture of 0.1 g. bis(triphenylphosphine)palladium maleic anhydride was added. When the mixture was heated in the atmosphere of nitrogen at 140° C. for 20 hours, a resinous material was obtained. When this material was dissolved in benzene and recrystallized from methanol, a polyadduct was obtained in a yield of 95%. The number average molecular weight of said polyadduct was about 1,500.

EXAMPLE 25

By the polymerization operations similar to those in Example 24, 7.4 g. of diphenylsilane and 8.0 g. of allyl succinate were reacted together and a polyadduct having an average molecular weight of 1,450 was obtained in a yield of 89%.

EXAMPLE 26

By a process similar to that in Example 24, 7.4 g. of diphenylsilane and 9.0 g. of diallyl adipate were reacted together and a polyadduct having an average molecular weight of 1,000 was obtained in a yield of 60%.

EXAMPLE 27

By a process similar to that in Example 24, 7.4 g. of diphenylsilane and 11.3 g. of allyl sebacate were reacted together and a polyadduct having an average molecular weight of 1,100 was obtained in a yield of 80%.

EXAMPLE 28

By a process similar to that in Example 24, 7.4 g. of diphenylsilane and 9.9 g. of diallyl phthalate were reacted together and a polyadduct having an average molecular weight of about 2,800 was obtained in a yield of 85%.

EXAMPLE 29

A mixture of 7.9 g. of divinyl adipate, 7.4 g. of diphenylsilane and 0.2 g. of bis(triphenylphosphine)dibromopalladium were blended together and the mixture was heated at 120–130° C. in an atmosphere of nitrogen. After 15 hours the mixture solidified. When the product was dissolved in 200 cc. of benzene, 40% of the product was soluble in benzene and it was found that the average molecular weight of the soluble material was 1,500. The portion which was insoluble in benzene was, from an evaluation of its silicone content, a polyadduct having a network structure of 4 mols of divinyl adipate to 1 mol of diphenylsilane.

EXAMPLE 30

To dimethylpolysiloxane containing 1 mol percent of methyl hydro-siloxane unit in a molecule, 1,5-hexadiene was added in an amount such that the ratio of silicone-hydrogen group was 1.5 per vinyl group. To this mixture bis(triphenylphosphine)palladium benzoquinone was added in an amount such that the number of palladium atoms per 1,000 silicone-hydrogen groups was about one. The mixture was heated at 125–130° C. for 20 hours. A tenacious, transparent gel-like material was obtained.

EXAMPLE 31

16.2 g. of 1,2-polybutadiene (molecular weight 3,000) and 13.5 g. of trichlorosilane were dissolved in 100 mol of benzene, and 0.2 g. of tetrakis(triphenylphosphine) palladium was added. The mixture was heated at 110° C. for 10 hours. After the reaction and when the benzene was distilled off, 29.2 g. of gel-like adduct was obtained.

EXAMPLE 32

Trichlorosilane (6.77 g.) and butadiene (5 cc.) were charged in an autoclave, to which 0.1 g. of tetrakis(triphenylphosphine)palladium was added as a catalyst. The mixture was reacted at 100° C. for 2 hours. By distilling the reaction product at 140–142° C., 8.9 g. of 1-(trichlorosilyl)-2-butene was obtained. The confirmation of this product was done by the following peaks of the NMR spectrum. 8.92τ (doublet, 3H), 8.03τ (doublet, 2H) and 3.2–4.2τ (multiplet, 2H).

EXAMPLE 33

Using 0.1 g. of bis(triphenylphosphine)dichloropalladium as a catalyst, 3.4 g. of isoprene was reacted with 6.77 g. of trichlorosilane at 110° C. for 3 hours. By distilling the reaction product, 8.5 g. of 1-(trichlorosilyl)-2-methyl-2-butene was obtained. The structure was confirmed by the following NMR spectrum. 8.36τ (doublet, 3H), 8.15τ (singlet, 3H), 7.62τ (singlet, 2H) and 4.54τ (quintet, 1H).

EXAMPLES 34–127

In the following examples the silane compounds were reacted with the olefine compounds at the temperatures and for the times noted in the chart, in the presence of the catalyst. The products were separated by distillation. The structure of the products were confirmed by comparing the infrared spectrum of the product with the infrared spectrum of a standard product synthesized by the process of the prior art.

| Example | Silane (g.) | Olefine (g.) | Catalyst (g.) | Reaction temperature, °C | Reaction time (hr.) | Product | Yield, percent (g.) |
|---|---|---|---|---|---|---|---|
| 34 | HSiCl₃ (6.77) | Ethylene (5.0) | Pd(PPh₃)₄ (0.1) | 110 | 6 | Trichlorosilylethane | 90.5 (7.4) |
| 35 | HSiCl₃ (6.77) | Propylene (2.1) | Pd(PBu₃)₄ (0.1) | 120 | 5 | 1-(trichlorosilyl)-propane | 85.6 (7.6) |
| 36 | HSiCl₃ (6.77) | 1-butene (2.8) | Pd[CH₃-C₆H₄-P]₄ (0.1) | 120 | 7 | 1-(trichlorosilyl)-butane | 88.8 (8.5) |
| 37 | HSiCl₃ (6.77) | Isobutene (2.8) | Pd[(C₆H₅)₃P]₄ (0.1) | 120 | 10 | 1-(trichlorosilyl)-2-methylpropane | 60.6 (5.7) |
| 38 | HSiCl₃ (6.77) | 1-pentene (3.5) | PdCl₂(PPh₃)₂ (0.2) | 120 | 5 | 1-(trichlorosolyl)-pentane | 90.6 (9.3) |
| 39 | HSiCl₃ (6.77) | 2-methyl-1-pentene (3.5) | Pd(PPh₃)₄ (0.1) | 120 | 10 | 1-(trichlorosilyl)-2-methylpentane | 55.4 (5.8) |
| 40 | HSiCl₃ (6.77) | 1-octene (5.6) | PdCl₂[(C₆H₅)₃P]₂ (0.2) | 120 | 8 | 1-(trichlorosilyl)-octane | 80.0 (9.9) |
| 41 | HSiCl₃ (6.77) | 1-decene (7.0) | PdCl₂(PEt₃)₂ (0.2) | 120 | 8 | 1-(trichlorosilyl)-decane | 84.3 (11.6) |
| 42 | HSiCl₃ (6.77) | Cyclootene (5.5) | Pd(PPh₃)₄ (0.1) | 110 | 8 | Trichlorosilylcyclo-octane | 30 (3.7) |
| 43 | HSiCl₃ (6.77) | Vinylcyclohexene (5.4) | PdBr₂(PPh₃)₂ (0.2) | 120 | 10 | 1-(trichlorosilyl)-2-(3-cyclohexenyl)-ethane | 82.3 (10.1) |
| 44 | HSiCl₃ (6.77) | Vinyl chloride (3.1) | PdBr₂[P(C₆H₄-OCH₃)₃]₂ (0.2) | 120 | 5 | 1-chloro-2-(trichlorosilyl)ethane | 75.2 (7.5) |
| 45 | HSiCl₃ (6.77) | Vinyl acetate (4.3) | Pd[P(C₆H₄-CH₃)₃]₄ (0.1) | 130 | 5 | 1-(trichlorosilyl)-2-acetoxyethane | 87.5 (9.7) |
| 46 | HSiCl₃ (6.77) | Vinyl ethyl ether (3.6) | PdCl₂[P(OBu)₃]₂ (0.2) | 120 | 8 | 1-(trichlorosilyl)-2-ethoxyethane | 55.8 (5.8) |
| 47 | HSiCl₃ (6.77) | Allyl ethyl ether (4.3) | Pd[P(C₆H₄Cl)₃]₄ (0.1) | 120 | 10 | 1-(trichlorosilyl)-3-ethoxyethane | 76.7 (8.5) |
| 48 | HSiCl₃ (6.77) | Allene (2) | PdCl₂(PPh₃)₂ (0.2) | 120 | 5 | Allyltrichlorosilane | 70.6 (6.2) |
| 49 | HSiCl₃ (6.77) | 1-octene (5.6) | Pd(PPh₃)₄ (0.1) | 120 | 5 | 1-(trichlorosilyl)-octane | 93.0 (11.5) |
| 50 | HSiCl₃ (6.77) | do | Pd(PPh₃)₄ (0.1) | 80 | 10 | do | 51.7 (6.4) |
| 51 | HSiCl₃ (6.77) | do | PdCl₂(AsPh₃)₂ (0.2) | 120 | 10 | do | 29.9 (3.7) |
| 52 | HSiCl₃ (6.77) | do | PdCl₂(SbPh₃)₂ (0.2) | 130 | 8 | do | 20.2 (2.5) |
| 53 | HSiCl₃ (6.77) | do | PdCl₂(PhO)₃P] (0.2) | 120 | 10 | do | 60.6 (7.5) |
| 54 | HSiCl₃ (6.77) | 1-hexene (4.2) | Pd(PPh₃)₂O (0.2) | 110 | 5 | 1-(trichlorosilyl)-hexane | 90.1 (9.9) |
| 55 | HSiCl₃ (6.77) | do | [(Ph₃P)₂Pd]₂ | 120 | 5 | do | 92.0 (1.1) |
| 56 | HSiCl₃ (6.77) | do | (PPh₃)₂Pd(NH-C(O)-NC-CN) (0.3) | 130 | 7 | do | 60.1 (6.6) |
| 57 | HSiCl₃ (6.77) | do | (PPh₃)₂Pd(OPh)₂ (0.2) | 120 | 5 | do | 80.1 (8.8) |

| Example | Silane (g.) | Olefine (g.) | Catalyst (g.) | Reaction temperature, °C. | Reaction time (hr.) | Product | Yield, percent (g.) |
|---|---|---|---|---|---|---|---|
| 58 | HSiCl₃ (6.77) | ...do... | (PPh₃)₂Pd₂(CCl₂=CHCl) (0.2) | 130 | 10 | ...do... | 92.9 (10.2) |
| 59 | HSiCl₃ (6.77) | ...do... | (PPh₃)₂Pd(naphthoquinone) (0.2) | 120 | 7 | ...do... | 94.8 (10.4) |
| 60 | HSiCl₃ (6.77) | ...do... | (PPh₃)₂Pd(O₂) (0.1) | 80 | 8 | ...do... | 95.7 (10.5) |
| 61 | HSiCl₃ (6.77) | ...do... | PdBr₂(PEt₃)₂ (0.3) | 80 | 10 | ...do... | 65.0 (7.15) |
| 62 | HSiCl₃ (6.77) | ...do... | PdI₂(PEt₃)₂ (0.3) | 100 | 10 | ...do... | 60.6 (6.6) |
| 63 | HSiCl₃ (6.77) | ...do... | PdCl₂(BuO)₃P)₂ (0.2) | 100 | 8 | ...do... | 77.4 (8.5) |
| 64 | CH₃Cl₂SiH (5.75) | ...do... | PdBr₂(PPh₃)₂ (0.2) | 110 | 5 | 1-(dichloromethylsilyl) hexane | 80.3 (8.0) |
| 65 | CH₃Cl₂SiH (5.75) | ...do... | Pd(PPh₃)₂(furandione) (0.1) | 110 | 6 | ...do... | 89.5 (8.9) |
| 66 | CH₃Cl₂SiH (5.75) | ...do... | Pd(PPh₃)₂(MeO₂C-CH=CH-CO₂Me) | 110 | 8 | ...do... | 88.5 (8.8) |
| 67 | Cl(CH₃)₂SiH (4.73) | ...do... | PdCl₂(PPh₃)₂ (0.2) | 120 | 6 | 1-(chlorodimethylsilyl) hexane | 86.1 (7.7) |
| 68 | Cl(CH₃)₂SiH (4.73) | ...do... | Pd(PPh₃)₂(furandione) (0.1) | 110 | 6 | ...do... | 89.5 (8.0) |
| 69 | Cl(CH₃)₂SiH (4.73) | 1-hexene (4.2) | Pd(AsPh₃)₄ (0.1) | 120 | 6 | 1-(chlorodimethylsilyl) hexane | 77.2 (6.9) |
| 70 | (CH₃)₃Si-O-Si(CH₃)₂H (6.7) | Ethylene (50 atm.) | Pd(PPh₃)₄ (0.1) | 100 | 7 | Tetramethyldiethyldisiloxane | 89.5 (8.5) |
| 71 | H₂SiCl₂ (5.05) | ...do... | Pd(PPh₃)₄ (0.1) | 100 | 5 | Dichlorodiethylsilane | 91.7 (7.2) |
| 72 | H₂SiCl₂ (5.05) | 1-hexene (4.2) | Pd(PPh₃)₄ (0.1) | 100 | 8 | Dichlorohexylsilane | 82.1 (7.6) |
| 73 | H₃SiCl (3.3) | Ethylene (50 atm.) | Pd(PPh₃)₄ (0.1) | 100 | 5 | Chlorotriethylsilane | 88.0 (6.6) |
| 74 | H₃SiCl (3.3) | 1-hexene (4.2) | Pd(PPh₃)₄ (0.1) | 110 | 5 | Chlorohexylsilane | 85.3 (6.4) |
| 75 | HSiCl₃ (6.77) | Ethylene (50 atm.) | PdCl₂ (0.1) + PPh₃ (1.0) | 100 | 5 | 1-(trichlorosilyl) ethane | 89.4 (7.3) |
| 76 | HSiCl₃ (6.77) | 1-hexene (4.2) | PdBr₂ (0.1) + PPh₃ (1.0) | 110 | 5 | 1-(trichlorosilyl)-hexane | 82.0 (9.0) |

| Example | Silane (g.) | Olefine (g.) | Catalyst (g.) | Reaction temperature, °C. | Reaction time (hr.) | Product | Yield, percent (g.) |
|---|---|---|---|---|---|---|---|
| 77 | HSiCl₃ (6.77) | do | PdCl₂ (0.1) + PPh₃ (1.0) | 120 | 6 | do | 65.6 (7.2) |
| 78 | HSiCl₃ (6.77) | do | Pd(CN)₂ (0.1) + PPh₃ (1.0) | 120 | 8 | do | 70.2 (7.7) |
| 79 | HSiCl₃ (6.77) | do | PdO (0.1) + PPh₃ (1.0) | 110 | 6 | do | 80.1 (8.8) |
| 80 | HSiCl₃ (6.77) | do | Pd(OAc)₂ (0.1) + PBu₃ (1.0) | 80 | 10 | do | 75.6 (8.3) |
| 81 | HSiCl₃ (6.77) | do | Pd(NO₃)₂ (0.1) + PPh₃ (1.0) | 100 | 8 | do | 82.0 (9.0) |
| 82 | HSiCl₃ (6.77) | do | Pd(HCOO)₂ (0.1) + PPh₃ (1.0) | 110 | 5 | do | 59.2 (6.5) |
| 83 | HSiCl₃ (6.77) | do | Pd(C₆H₄COO)₂ (0.1) + PPh₃ (1.0) | 120 | 8 | do | 74.6 (8.2) |
| 84 | HSiCl₃ (6.77) | do | Pd(acac)₂ (0.1) + PPh₃ (1.0) | 120 | 10 | do | 82.9 (9.1) |
| 85 | HSiCl₃ (6.77) | do | (π-AllPdCl)₂ (0.1) + PPh₃ (1.0) | 110 | 8 | do | 75.6 (8.8) |
| 86 | HSiCl₃ (6.77) | do | PdCl₂(C₆H₄=NOH)₂ (0.1) + PPh₃ (1.0) | 120 | 8 | do | 72.0 (7.9) |
| 87 | HSiCl₃ (6.77) | do | PdCl₂(dimethylglyoxime) | 130 | 6 | do | 75.6 (8.3) |
| 88 | HSiCl₃ (6.77) | do | Na₂PdCl₄ (0.1) + (C₆H₁₁)₃P (1.0) | 130 | 10 | do | 57.8 (6.35) |
| 89 | HSiCl₃ (6.77) | do | PdCl₂(cyclooctadiene) (0.1) + PBu₃ (0.8) | 120 | 7 | do | 85.6 (9.4) |
| 90 | HSiCl₃ (6.77) | do | PdCl₂(norbornadiene) (0.1) + AsPh₃ (0.6) | 150 | 4 | do | 56.5 (6.2) |
| 91 | HSiCl₃ (6.77) | do | π-allPd(acac) (0.1) + PPh₃ (0.8) | 120 | 5 | do | 86.5 (9.5) |
| 92 | HSiCl₃ (6.77) | do | PdCl₂(PhNH₂)₂ (0.1) + PPh₃ (0.8) | 120 | 6 | do | 68.3 (7.5) |
| 93 | HSiCl₃ (6.77) | do | Pd(glycine)₂ (0.1) + PEt₃ (0.6) | 120 | 8 | do | 74.7 (8.2) |
| 94 | HSiCl₃ (6.77) | do | K₂[Pd(OCH₃)₄] (0.1) + PBu₃ (0.6) | 120 | 10 | do | 56.5 (6.2) |
| 95 | CH₃Cl₂SiH | do | K₂[Pd(C≡CCH₃)₄] (0.1) + PPh₃ (0.8) | 100 | 8 | do | 57.2 (5.7) |
| 96 | CH₃Cl₂SiH (5.75) | do | (tetraphenylcyclobutadiene)PdCl₂ (0.1) + PPh₃ (0.6) | 110 | 6 | do | 85.4 (8.6) |
| 97 | CH₃Cl₂SiH (5.75) | do | [(Et)Pd(Br)₂]₂ dimer (0.1) + PPh₃ (0.1) | 120 | 5 | 1-(dichloromethylsilyl)hexane | 88.5 (8.8) |

| Example | Silane (g.) | Olefine (g.) | Catalyst (g.) | Reaction temperature, °C. | Reaction time (hr.) | Product | Yield, percent (g.) |
|---|---|---|---|---|---|---|---|
| 98 | Cl(CH₃)₂SiH (4.73) | ...do... | (CH₃O-C₆H₄-Pd-Cl)₂ (0.1) + PPh₃ (0.8) | 110 | 6 | 1-(chlorodimethylsilyl)hexane | 65.0 (5.7) |
| 99 | Cl(CH₃)₂SiH (4.73) | ...do... | TransPd(NH₃)₂(NO₂)₂ (0.8) + PPh₃ (0.8) | 130 | 5 | ...do... | 76.1 (6.8) |
| 100 | CH₃−HSi−O−SiH−CH₃ / CH₃ CH₃ (6.7) | Ethylene (50 atm.) | PdCl₂(PhCN)₂ (0.1) + PPh₃ (0.8) | 110 | 8 | Diethyltetramethyldisiloxane | 89.4 (8.5) |
| 101 | CH₃−HSi−O−SiH−CH₃ / CH₃ CH₃ (6.7) | ...do... | PdCl₂(C₆H₆) (0.1) + PPh₃ (0.8) | 140 | 6 | ...do... | 42.1 (4.0) |
| 102 | CH₃−HSi−O−SiH−CH₃ / CH₃ CH₃ (6.7) | ...do... | PdCl₂(PhCN)₂ (0.1) + SbPh₃ (0.8) | 130 | 5 | ...do... | 35.8 (3.4) |
| 103 | CH₃−HSi−O−SiH−CH₃ / CH₃ CH₃ (6.7) | ...do... | PdCl₂(C₆H₆) (0.1) + P(OPH)₃ (0.9) | 120 | 7 | ...do... | 69.5 (6.6) |
| 104 | H₂SiCl₂ (5.05) | ...do... | PdCl₂(C₆H₆)(C₆H₆) (0.1) + PPh₃ (1.0) | 120 | 5 | Dichlorodiethylsilane | 85.3 (6.7) |
| 105 | H₃SiCl (5.05) | 1-hexene (4.2) | PdCl₂(PhCN)₂ (0.2) + PPh₃ (1.0) | 100 | 5 | Dichlorohexylsilane | 72.4 (6.7) |
| 106 | H₃SiCl (3.3) | Ethylene (50 atm.) | (C₆H₆-PdCl₂)₂ (0.2) + PPh₃ (1.0) | 100 | 7 | Chlorotriethylsilane | 76.0 (5.8) |
| 107 | HSiCl₃ (3.3) | 1-hexene (4.2) | PdCl₂(PhCH=NOH)₂ (0.1) + PPh₃ (0.9) | 110 | 6 | Chlorohexylsilane | 73.3 (5.5) |
| 108 | HSiCl₃ (6.77) | Allene (2) | Pd black (0.1) + PPh₃ (1.0) | 120 | 5 | Allyltrichlorosilane | 77.5 (6.8) |
| 109 | HSiCl₃ (6.77) | Propylene (2.1) | Pd black (0.1) + PPh₃ (1.0) | 120 | 8 | 1-(trichlorosilyl)propane | 93.5 (8.4) |
| 110 | HSiCl₃ (6.77) | 1-octene (5.6) | Pd black (0.1) + PPh₃ (1.0) | 120 | 5 | 1-(trichlorosilyl)octane | 70.4 (8.7) |
| 111 | HSiCl₃ (6.77) | Cyclooctene (5.5) | Pd black (0.1) + PPh₃ (1.0) | 120 | 15 | Triclorosilyloctane | 20.3 (2.5) |
| 112 | HSiCl₃ (6.77) | 1-hexene (4.2) | Pd black (0.1) + PPh₃ (0.5) | 120 | 5 | 1-(trichlorosilyl)-hexane | 80.8 (8.8) |
| 113 | HSiCl₃ (6.77) | ...do... | 10% Pd—C (0.3) + AsPh₃ (1.0) | 120 | 10 | ...do... | 51.0 (5.6) |
| 114 | HSiCl₃ (6.77) | ...do... | Pd black (0.1) + SbPh₃ (1.0) | 130 | 10 | ...do... | 40.0 (4.4) |
| 115 | HSiCl₃ (6.77) | Styrene (5.2) | Pd black (0.1) + PPh₃ (1.0) | 100 | 5 | α-(trichlorosilyl)-ethyl-benzene | 91.8 (11.0) |
| 116 | CH₃Cl₂SiH (5.75) | 1-hexene (4.2) | Pd black (0.1) + PEt₃ (1.0) | 120 | 6 | 1-(dichlorosilyl)-hexane | 68.4 (6.8) |
| 117 | CH₃Cl₂SiH (5.75) | ...do... | H₂PtCl₆ (0.1) + PPh₃ (0.8) | 100 | 8 | ...do... | 57.2 (5.1) |
| 118 | Cl(CH₃)₂SiH (4.73) | ...do... | Pd black (0.1) + P(NMe₂)₃ (0.8) | 100 | 10 | 1-(chlorodimethylsilyl) hexane | 62.6 (5.6) |
| 119 | Cl(CH₃)₂SiH (4.73) | ...do... | Pd black (0.1) + PCl₃ (1.) | 130 | 6 | ...do... | 35.8 (3.2) |
| 120 | HSiCl₂Et (6.46) | ...do... | Pd black (0.1) + PClEt (1.0) | 120 | 6 | 1-(dichloroethylsilyl) hexane | 54.4 (5.8) |

| Example | Silane (g.) | Olefine (g.) | Catalyst (g.) | Reaction temperature, °C. | Reaction time (hr.) | Product | Yield, percent (g.) |
|---|---|---|---|---|---|---|---|
| 121 | HSiCl₂Et (6.45) | ....do.... | Pd black (0.1) +  P (1.0) | 120 | 8 | ....do.... | 31.0 (3.3) |
| 122 | H—Si—O—Si—H (6.7) with Me Me / Me Me | Ethylene (50 atm.) | Pd (0.1) + P(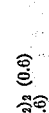—OCH₃)₃ (1.0) | 120 | 5 | Diethyltetramethyldisiloxane | 29.5 (2.8) |
| 123 | H—Si—O—Si—H (6.7) with Me Me / Me Me | 1-hexene (4.2) | Pd (0.1) + P(—Cl)₃ (1.0) | 130 | 8 | Ethyltetramethyldisiloxane | 45.4 (4.95) |
| 124 | H₂SiCl₂ (5.05) | Ethylene (50 atm.) | Pd (0.1) + (Ph₂P—CH₂)₂ (0.6) | 120 | 8 | Dichlorodiethylsilane | 66.2 (6.2) |
| 125 | H₂SiCl₂ (5.05) | 1-hexene (4.2) | Pd (0.1) + AsEtPh₂ (0.6) | 130 | 10 | Dichlorodihexylsilane | 31.3 (2.9) |
| 126 | H₃SiCl (3.3) | Ethylene (50 atm.) | Pd (0.1) + AsPhCl (0.6) | 120 | 6 | Chlorotriethylsilane | 40.0 (3.0) |
| 127 | H₃SiCl (3.3) | 1-hexene (4.2) | Pd (0.1) + AsHPh₂ (0.5) | 130 | 10 | Chlorotrihexylsilane | 29.4 (2.2) |

NOTE.—Ph=phenyl.  Bu=butyl.  Et=ethyl.  Ac=acetyl.  π-all=π-allyl.

EXAMPLES 128–177

In the following examples the silane compounds were reacted with the diene compounds in the presence of the catalyst at the temperatures and for the times noted in the chart. The structures of the products were confirmed by comparing the infrared spectrums of the products with the infrared spectrums of standard products synthetized by the process of the prior art.

| Example | Silane (g.) | Diene (g.) | Catalyst (g.) | Reaction temperature, °C. | Reaction time (hr.) | Product | Yield, percent (g.) |
|---|---|---|---|---|---|---|---|
| 128 | HSiCl₃ (6.77) | Isoprene (3.4) | Pd(PPh₃)₄ (0.1) | 100 | 2 | 1-(trichlorosilyl)-2-butene | 91.5 (9.3) |
| 129 | HSiCl₃ (6.77) | 2,3-dimethyl-1,3-butadiene (4.1) | Pd(PPh₃)₄ (0.1) | 50 | 4 | 1-(trichlorosilyl)-2,3-dimethyl-2-butene | 100 (10.8) |
| 130 | HSiCl₃ (6.77) | 1,3-pentadiene (3.4) | Pd(PPh₃)₄ (0.1) | 80 | 4 | 2-(trichlorosilyl)-3-pentene | 89.5 (9.0) |
| 131 | HSiCl₃ (6.77) | 1,3,7-octatriene (5.4) | Pd(PPh₃)₄ (0.1) | 100 | 3 | 5-(trichlorosilyl)-1,6-octadiene | 82.1 (10.0) |
| 132 | HSiCl₃ (6.77) | Butadiene (5 cc.) | Pd[]₄ (0.1) | 100 | 5 | 1-(trichlorosilyl)-2-butene | 86.6 (8.2) |
| 133 | HSiCl₃ (6.77) | ....do.... | Pd(PBu₃)₄ (0.1) | 110 | 6 | ....do.... | 78.7 (7.45) |
| 134 | HSiCl₃ (6.77) | ....do.... | PdIP(OPh)₃]₄ (0.1) | 110 | 5 | ....do.... | 83.5 (7.9) |
| 135 | HSiCl₃ (6.77) | ....do.... | Pd(AsPh₃)₄ (0.1) | 120 | 5 | ....do.... | 60.2 (5.7) |
| 136 | HSiCl₃ (6.77) | ....do.... | Pd(SbPh₃)₄ (0.1) | 130 | 5 | ....do.... | 52.3 (4.95) |
| 137 | HSiCl₃ (6.77) | ....do.... | PdCl₂(PPh₃)₂ (0.1) | 100 | 5 | ....do.... | 86.6 (8.2) |
| 138 | HSiCl₃ (6.77) | ....do.... | PdCl₂[P()₃]₂ (0.1) | 120 | 5 | ....do.... | 83.0 (7.85) |

| Example | Silane (g.) | Diene (g.) | Catalyst (g.) | Reaction temperature, °C. | Reaction time (hr.) | Product | Yield, percent (g.) |
|---|---|---|---|---|---|---|---|
| 139 | HSiCl₃ (6.77) | do | PdCl₂(P-Bu₃)₂ (0.1) | 120 | 5 | do | 89.7 (8.5) |
| 140 | HSiCl₃ (6.77) | do | PdCl₂(P-Et₃)₂ (0.1) | 110 | 5 | do | 85.5 (8.1) |
| 141 | HSiCl₃ (6.77) | do | PdBr₂(PPh₃)₂ (0.1) | 100 | 5 | do | 91.8 (8.7) |
| 142 | HSiCl₃ (6.77) | do | PdI₂(PPh₃)₂ (0.1) | 100 | 5 | do | 90.8 (8.6) |
| 143 | HSiCl₃ (6.77) | do | PdCl₂[P−(OPh)₃]₂ (0.1) | 120 | 4 | do | 66.0 (6.25) |
| 144 | HSiCl₃ (6.77) | do | PdCl₂[P−(OBu)₃]₂ (0.1) | 120 | 6 | do | 72.8 (6.9) |
| 145 | HSiCl₃ (6.77) | do | PdBr₂[P−(OEt)₃]₂ (0.1) | 120 | 5 | do | 70.7 (6.7) |
| 146 | HSiCl₃ (6.77) | do | PdCl₂(Ph₂PCH₂CH₂PPh₂) (0.1) | 130 | 5 | do | 58.1 (5.5) |
| 147 | HSiCl₃ (6.77) | do | PdCl₂(Ph₂PCH₂CH₂SPh₂) (0.1) | 130 | 6 | do | 61.3 (5.8) |
| 148 | HSiCl₃ (6.77) | do | PdBr₂(Ph₂PCH₂CH₂PPh₂) (0.1) | 100 | 6 | do | 75.0 (7.1) |
| 149 | HSiCl₃ (6.77) | do | PdCl₂(Ph₂P−C₆H₄−SCH₃) (0.1) | 100 | 6 | do | 71.8 (6.8) |
| 150 | HSiCl₃ (6.77) | Isoprene (3.4) | Pd (0.05) + PPh₃ (0.5) | 100 | 5 | 1-(trichlorosilyl)-2-methyl-2-butene. | 94.9 (9.65) |
| 151 | HSiCl₃ (6.77) | 1,3,7-octatriene (5.4) | Pd (0.05) + PPh₃ (0.5) | 120 | 5 | 5-(trichlorosilyl)-1,6-octadiene. | 81.3 (9.9) |
| 152 | HSiCl₃ (6.77) | 1,3-pentadiene (3.4) | Pd (0.05) + PPh₃ (0.5) | 110 | 6 | 2-(trichlorosilyl)-3-pentene. | 81.6 (8.3) |
| 153 | HSiCl₃ (6.77) | 2,3-dimethyl-1,3-butadiene (4.1) | Pd (0.05) + PPh₃ (0.5) | 90 | 5 | 1-(trichlorosilyl)-2,3-dimethyl-2-butene. | 87.4 (9.5) |
| 154 | HSiCl₃ (6.77) | Butadiene (5 cc.) | Pd (0.05) + P(−C₆H₄H)₃ (0.5) | 100 | 4 | 1-(trichlorosilyl)-2-butene. | 53.8 (5.1) |
| 155 | HSiCl₃ (6.77) | do | Pd (0.05) + PBu₃ (0.4) | 100 | 4 | do | 80.3 (7.6) |
| 156 | HSiCl₃ (6.77) | do | Pd (0.05) + PEt₃ (0.4) | 110 | 5 | do | 75.0 (7.1) |
| 157 | HSiCl₃ (6.77) | do | Pd (0.05) + P(OBu)₃ (0.4) | 120 | 4 | do | 77.5 (7.35) |
| 158 | HSiCl₃ (6.77) | do | Pd (0.05) + P(OMe)₃ (0.4) | 110 | 6 | do | 61.2 (5.8) |
| 159 | HSiCl₃ (6.77) | do | Pd (0.05) + AsPh₃ (1.0) | 120 | 5 | do | 68.6 (6.5) |
| 160 | HSiCl₃ (6.77) | do | Pd (0.05) + SbPh₃ (1.0) | 120 | 6 | do | 58.1 (5.5) |
| 161 | HSiCl₃ (6.77) | do | Pd (0.05) + PMePh₂ (0.8) | 100 | 6 | do | 82.4 (7.8) |
| 162 | HSiCl₃ (6.77) | do | Pd (0.05) + PMe₂Ph (0.8) | 110 | 5 | do | 73.9 (7.0) |
| 163 | HSiCl₃ (6.77) | do | PdBr₂ (0.1) + PPh₃ (0.5) | 110 | 6 | do | 90.8 (8.6) |
| 164 | HSiCl₃ (6.77) | do | PdI₂ (0.1) + PPh₃ (0.5) | 120 | 5 | do | 91.8 (8.7) |
| 165 | HSiCl₃ (6.77) | do | PdO (0.1) + PPh₃ (0.5) | 110 | 6 | do | 89.8 (8.5) |
| 166 | HSiCl₃ (6.77) | do | Pd(OAc)₂ (0.1) + PPh₃ (0.5) | 110 | 5 | do | 85.5 (8.1) |
| 167 | HSiCl₃ (6.77) | do | Pd(NO₃)₂ (0.1) + PPh₃ (0.5) | 120 | 5 | do | 85.5 (8.1) |
| 168 | CH₃Cl₂SiH (5.75) | do | Pd black (0.05) + PPh₃ (0.5) | 100 | 6 | 1-(dichloromethylsilyl)-2-butene. | 88.7 (7.5) |
| 169 | Cl(CH₃)₂SiH (4.73) | do | Pd black (0.05) + PPh₃ (0.5) | 110 | 6 | 1-(chlorodimethylsilyl)-2-butene. | 83.4 (6.2) |
| 170 | (CH₃)₃SiH (3.7) | do | Pd black (0.05) + PPh₃ (1.0) | 140 | 10 | 1-(trimethylsilyl)-2-butene. | 76.6 (4.9) |
| 171 | Et₃SiH (5.8) | do | Pd black (0.05) + PPh₃ (1.0) | 150 | 6 | 1-(triethylsilyl)-2-butene. | 80.0 (6.8) |
| 172 | HSiCl₂(OMe) (6.55) | do | Pd black (0.05) + PPh₃ (1.0) | 110 | 5 | 1-(dichloromethoxysilyl)-2-butene. | 85.4 (7.9) |
| 173 | HSiCl(OMe)₂ (6.33) | do | Pd black (0.05) + PPh₃ (1.0) | 130 | 7 | 1-(chlorodimethoxysilyl)-2-butene. | 64.2 (5.8) |
| 174 | HSi(OMe)₃ (6.1) | do | Pd black (0.05) + PPh₃ (1.0) | 150 | 8 | 1-(trimethoxysilyl)-2-butene. | 37.5 (3.3) |
| 175 | H₂SiCl₂ (5.05) | do | Pd black (0.05) + PPh₃ (1.0) | 110 | 6 | 1-(dichlorosilyl)-2-butene. | 81.3 (6.3) |
| 176 | H₃SiCl (3.33) | do | Pd black (0.05) + PPh₃ (1.0) | 120 | 8 | 1-(chlorosilyl)-2-butene. | 76.3 (4.6) |
| 177 | Cl₃SiH (6.77) | 1,3-cyclooctadiene (6) | Pd black (0.05) + PPh₃ (0.5) | 130 | 8 | 3-(trichlorosilyl)cyclooctene. | 45.0 (5.5) |

NOTE.—Ph=phenyl. Et=ethyl. Me=methyl. Bu=butyl.

The following is claimed:

1. In the process for the manufacture of organosilicone compound wherein an olefinically unsaturated compound is reacted with a hydrosilane compound, the improvement which comprises conducting the reaction in the presence of a catalytically effective amount of a catalyst comprised of palladium and a trivalent ligand selected from the group consisting of phosphorus, arsenic and antimony.

2. The process according to claim 1 wherein said reaction is conducted in the presence of about 0.00001–1 mol percent of said catalyst based on said hydrosilane compound.

3. The process according to claim 1 wherein said olefinically unsaturated compound is a 1-olefin.

4. The process of claim 1 wherein said olefin is a conjugated diolefin.

5. The process according to claim 1 wherein said catalyst is comprised of 0.5–20 equivalents of said trivalent ligand per equivalent of palladium.

References Cited

UNITED STATES PATENTS

| | | | |
|---|---|---|---|
| 2,823,218 | 2/1958 | Speier et al. | 260—448.2 E |
| 3,057,902 | 10/1962 | Pike | 260—448.2 E |
| 3,198,766 | 8/1965 | Nitzsche et al. | 260—448.2 E X |
| 3,231,594 | 1/1966 | Speier | 260—448.2 E |
| 3,257,440 | 6/1966 | Jex | 260—448.2 E |
| 3,271,362 | 9/1966 | Chalk et al. | 260—448.2 E X |

TOBIAS E. LEVOW, Primary Examiner

P. F. SHAVER, Assistant Examiner

U.S. Cl. X.R.

252—429 R, 429 B, 430, 431 P, 431 R; 260—448.8 R